3,202,587
METHOD OF ELIMINATING BACTERIAL CONTAMINATION OF MOLASSES MEDIUM IN THE PRODUCTION OF CITRIC ACID BY FERMENTATION
Roman Janovich Karklign, Pootsess 12, Apt. 5, and Velta Karlovna Berkolde, Dreilenu 6, Apt. 2, both of Riga, U.S.S.R.
No Drawing. Filed June 22, 1962, Ser. No. 204,632
2 Claims. (Cl. 195—36)

This invention relates to a method of eliminating bacterial contamination of molasses medium in the production of citric acid by fermentation.

This invention relates to the production of organic acids, and more particularly it relates to the elimination of bacterial contamination of the molasses medium in the production of citric acid.

It is known that the main problem encountered with in the process of citric acid fermentation in the production on a commercial scale is the liability of the culture medium to be readily inoculated by the air-borne contaminants.

Apart from a number of microorganisms which do not exert harmful effect on the process of fermentation, there exist certain bacteria which considerably deteriorate the fermentation. Bacteria of the *coli* group are the main antagonists to *Aspergillus niger* moulds which produce citric acid in the process of fermentation. Propagation of these bacteria in the fermentation media reduces acid-forming capacity of *Aspergillus niger* and sometimes completely inhibits growth of the mould.

Attempts have been made to eliminate bacterial contamination of the molasses medium by adding antiseptics. However, the inadequate effectiveness of the antiseptics has proved this method to be inefficient, and the main means of fighting the contaminants in wide-scale production consists in careful antiseptic treatment of the fermentation equipment, in particular the piping flanges, cuvette, joints, etc.

The sterilization is done as follows: after draining the washing waters and removing the moulds from the previous batch the cuvettes, racks, walls and floor of the fermentation chamber are washed with warm water, the walls are washed with brushes soaked in a 3% solution of copper sulphate; the floor of the chamber is treated with a 3% formaldehyde solution, the cuvettes and their outlets, are also treated with formaldehyde. The chamber is then sterilized with a mixture of steam and formaldehyde with subsequent inactivation of the formaldehyde by means of ammonia, as well as sterilization of the cuvettes by steam.

This method is a time and labour taking procedure which involves considerable expenditures of steam, formaldehyde, and ammonia but which, nevertheles, does not completely eliminate the possibility of bacterial contamination of the fermentation medium.

We have successfully solved the problem of eliminating the possibility of bacterial contamination of the molasses medium in the production of citric acid by fermentation and have realized our invention in practical use.

We have discovered that the addition of 5-nitro-2-furaldehyde semicarbazone to the fermentation medium almost completely eliminates the possibility of bacterial contamination.

The purpose of this invention is to eliminate any possibility of bacterial contamination of the molasses medium in the production of citric acid by fermentation. Another purpose of this invention is facilitation of the procedure and reduction of the treatment period of the fermentation equipment before charging.

The invention also provides for increase in the yields of citric acid and saved raw materials. Still another purpose of the invention is to improve the acid formation process, quicken the propagation of moulds and the development of mycelium due to absence of formaldehyde in the fermentation medium, which has an unfavourable effect on *Aspergillus niger* activities.

Among other advantageous purposes of the invention are economy of steam, ammonia and formaldehyde as well as improvements of working conditions in the fermentation division.

10 to 15 mg. of furacilin, that is, 5-nitro-2-furaldehyde-semicarbazone having formula

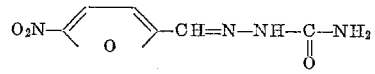

is added per litre of fresh molasses solution at 50° C. to the fresh fermentation solution, with the purpose of eliminating any possibility of bacterial contamination of the medium in the process of fermentation.

The furacilin is preliminarily dissolved in a small quantity of water and is poured into a sterilizer; the molasses solution is stirred for 30 minutes and is then discharged onto the fermentation cuvettes.

Use of furacilin greatly facilitates treatment of the fermentation chamber. When realizing the invention, it is recommended to avoid steam-formaldehyde treatment of the equipment. After draining the washing waters and removing the moulds from the previous batch, the cuvettes, racks, walls and the floor of the chamber are washed with water.

The outlets from the cuvettes leading to the stand-pipe are washed with water and sterilized with steam. The walls of the chamber are washed with brushes soaked in a 3% solution of copper sulphate; the floor is treated with 3% formaldehyde solution. After this treatment chambers piping, and cuvettes are then ready to be charged.

During production test of the invention, furacilin was added to the fermentation medium in the amount of 12 mg. per litre. In a test of the fermentation chamber for 18 cuvettes with a total area of 250 sq. m., height of added solution 15 cm., and the total amount of 36 cu. m. per two batches, furacilin was added to the lower cuvettes in the first batch, which made it possible to transfer the solution from the upper cuvettes to the lower in case mycelium had not developed in the upper cuvettes.

No bacterial contamination was observed in the cuvettes where furacilin had been added, whereas cuvettes containing solutions without furacilin showed signs of contamination. No contamination of any kind was observed on the cuvettes with furacilin even after deteriorated solution was transferred onto them from the upper cuvettes.

The yield of citric acid increased, whereas the consumption of molasses per 1 litre of acid decreased.

Addition of 10 to 15 mg. of furacilin per litre of the fermentation medium is not detrimental to the growth and acid-forming capacity of *Aspergillus niger*, but completely inhibits development of the *coli* bacteria. Often, the yields of critic acid from the infected molasses media containing furacilin additives are close or equal to a control. The results of three tests performed with addition of furacilin in different quantities, showing its effect on the yields of citric acid from infected molasses solutions are given in the following table:

| Furacilin dose | Control | Infected solution | | | | | | | | |
|---|---|---|---|---|---|---|---|---|---|---|
| | | 0 | 0.5 | 2 | 5 | 10 | 15 | 20 | 25 | 30 |
| Yield of citric acid, g./sq. m./day | 1,135 | 310 | 290 | 254 | 1,100 | 1,108 | 1,134 | 1,099 | 976 | 897 |
| Percent of control | 100 | 27 | 25 | 22 | 96 | 98 | 100 | 97 | 86 | 79 |
| Yield of citric acid, g./sq. m./day | 806 | 631 | 612 | 656 | 737 | 793 | 822 | 763 | 697 | 696 |
| Percent of control | 100 | 78 | 76 | 81 | 91 | 98 | 102 | 95 | 86 | 86 |
| Yield of citric acid, g./sq. m./day | 1,020 | 240 | 320 | 480 | 940 | 1,003 | 1,008 | 972 | 894 | 820 |
| Percent of control | 100 | 23 | 31 | 47 | 92 | 99 | 102 | 95 | 87 | 80 |

Due to the fact that the chamber and cuvettes do not have to be treated with formaldehyde which, to some degree, hinders development of mycelium, formation of the latter and growth of the *Aspergillus niger* spores is increased.

The present invention provides for greater yield of citric acid, as well as economy of molasses solution due to the sterility of the fermentation process.

Besides reduced consumption of steam, ammonia and formaldehyde, the chamber treatment period is cut down by 50% and, since work with formaldehyde and ammonia is not called for, working conditions in the fermentation division are considerably improved.

What we claim is:

1. In the process of making citric acid by fermentation of fresh molasses medium the improvement comprising eliminating bacterial contamination of such molasses medium by adding an effective amount of 5-nitro-2-furaldehyde semicarbazone having formula

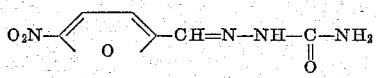

as an antiseptic to fresh molasses medium.

2. The process as claimed in claim 1 in which 10 to 15 mg. of said antiseptic is added per 1 litre of fresh molasses medium.

References Cited by the Examiner

UNITED STATES PATENTS 3,041,250   6/62   Wolnak et al. _____ 195—36 X

FOREIGN PATENTS 865,796   4/61   Great Britain.

OTHER REFERENCES

Lawrence: Chemical Abstracts 55, 9551F (1961).

A. LOUIS MONACELL, *Primary Examiner.*

ABRAHAM H. WINKELSTEIN, *Examiner.*